United States Patent
Settineri

(10) Patent No.: US 7,731,006 B2
(45) Date of Patent: Jun. 8, 2010

(54) AIRACTUATED CONE CLUTCH FAN DRIVE

(75) Inventor: Samuel E. Settineri, Marshall, MI (US)

(73) Assignee: BorgWarner Inc., Auburn Hills, MI (US)

( * ) Notice: Subject to any disclaimer, the term of this patent is extended or adjusted under 35 U.S.C. 154(b) by 639 days.

(21) Appl. No.: 11/675,156

(22) Filed: Feb. 15, 2007

(65) Prior Publication Data

US 2007/0131514 A1    Jun. 14, 2007

Related U.S. Application Data

(63) Continuation-in-part of application No. 10/905,505, filed on Jan. 7, 2005, now abandoned.

(51) Int. Cl.
*F16D 25/0632* (2006.01)
*F16D 13/26* (2006.01)

(52) U.S. Cl. ............... 192/91 A; 192/66.22; 192/89.27; 192/110 B

(58) Field of Classification Search ................ 192/66.2, 192/66.22, 89.27, 91 A; 416/169 A
See application file for complete search history.

(56) References Cited

U.S. PATENT DOCUMENTS

| 2,652,296 | A | * | 9/1953 | Palmgren et al. | ............. 384/459 |
| 3,684,397 | A | * | 8/1972 | Elmer | ........................ 416/39 |
| 3,757,914 | A | * | 9/1973 | Elmer | ...................... 192/48.3 |
| 3,777,866 | A | * | 12/1973 | Elmer | ......................... 192/91 |
| 3,985,214 | A | * | 10/1976 | Hall et al. | ..................... 192/91 |
| 4,044,729 | A | * | 8/1977 | Elmer | ..................... 123/41.12 |
| 4,899,861 | A | * | 2/1990 | Cummings, III | ........ 192/85 AA |
| 5,215,175 | A | * | 6/1993 | Fenzel | ....................... 192/91 A |
| 5,518,093 | A | * | 5/1996 | Hartig et al. | .................. 192/45 |
| 5,547,060 | A | * | 8/1996 | Giese | ......................... 192/110 |
| 5,667,045 | A | * | 9/1997 | Cummings, III | .......... 192/18 A |
| 5,996,753 | A | * | 12/1999 | Temme et al. | ................. 192/45 |
| 2006/0076210 | A1 | * | 4/2006 | Settineri | .................... 192/91 A |

OTHER PUBLICATIONS

Marks' Standard Handbook for Mechanical Engineers, 8th ed. New York, McGraw-Hill, 1978. pp. 8-74 to 8-77.*

* cited by examiner

*Primary Examiner*—Richard M. Lorence

(57) ABSTRACT

A clutch assembly having an overall diameter and overall axial length. Both the axial length and the ratio of the length to the diameter are reduced. A translatable clutch piston is in communication with a pressure chamber and is movable between a piston neutral position and a piston activated position in response to air pressure. A cone clutch member is moved from a clutch engaged position to a clutch disengaged position in response to the translatable clutch piston moving from the piston neutral position to the piston activated position. The cone clutch member engages the rotating drive shaft when in the clutch engaged position. A clutch spring member biases the cone clutch member into the clutch engaged position with a clutch engagement force. The clutch spring has a primary spring ratio of a wire diameter to a spring diameter optimized such that a maximum spring force is achieved while minimizing the spring length. A movable carrier member for the spring member has an increased axial length to reduce and limit abrasion damage to the piston and member. The bearing assembly has a reduced axial length limited by the ratio of its length to its inner diameter.

23 Claims, 2 Drawing Sheets

AIRACTUATED CONE CLUTCH FAN DRIVE

CROSS-REFERENCE TO RELATED APPLICATIONS

This is a continuation-in-part of U.S. patent application Ser. No. 10/905,505, filed on Jan. 7, 2005, now abandoned

TECHNICAL FIELD

The present invention relates generally to fan clutch assemblies and more particularly to methods and systems for improving and optimizing the operation and performance of airactuated cone clutch fan assemblies.

BACKGROUND OF THE INVENTION

Vehicle engines commonly utilize cooling assemblies to remove excess heat from the engine and maintain an optimal operating temperature. The cooling assembly pumps a coolant through the engine and other components in order to control engine temperature. Heat generated within the engine and other components is absorbed by the coolant and dispersed into the surrounding atmosphere through the use of a radiator. In order to improve dispersal by the radiator, it is common to utilize fan assemblies to draw or force air past the radiator to assist in temperature transmission.

It is not always desirable for such fan assemblies to be run continuously. At times, it is desirable for the temperature within the coolant to increase rather than decrease. Additionally, continuous operation when unnecessary places an non-required draw on the engine and thereby reduces efficiency. To compensate for this, present fan assemblies utilize fan clutch assemblies that allow for the selective engagement of the fan to the engine such that the fans are engaged only when necessary. The fan clutch assemblies may be operated in a plurality of configurations including hydraulic and air-pressure actuated. It is common for these systems to be biased towards fan operation such that when failure occurs in the clutch assembly, the fan continuously operates to keep the engine cool.

An issue with these fan assemblies and associated clutch assemblies stems from their location within the engine compartment. These assemblies must share space within the compartment with a variety of engine related systems. The assemblies, therefore, can be placed under severe dimensional restraints. However, fan clutch drives are commonly dimensionally constrained by the internal workings of the clutch which limits reduction of the drive assembly. This dimensional constraint, especially realized in clutch length and diameter, limits the applications wherein a pneumatic clutch can be utilized.

It would therefore be highly desirable to have pneumatic clutch fan assembly with a unique internal design wherein reduction in some of the external dimensions could be realized, along with corresponding reduction in material cost and weight. It would further be highly desirable for such a clutch assembly to provide optimal performance and operation while reducing or minimizing size and weight.

SUMMARY OF THE INVENTION

It is therefore an object to the present invention to provide a clutch assembly with a reduced size and weight clutch housing without sacrificing operation or performance. It is further an object of the present invention to provide a clutch assembly with reduced size and weight while maintaining optimized operation and performance.

In accordance with the objects of the present invention a clutch assembly is provided with a housing and a central piston mechanism that feeds a pressure chamber. A translatable clutch piston is in communication with the pressure chamber and is movable between a piston neutral position and a piston activated position in response to air pressure fed into the pressure chamber. A rotating drive shaft is positioned within the clutch housing. A cone clutch element is moved from a clutch engaged position to a clutch disengaged position in response to the translatable clutch piston moving from the piston neutral position to the piston activated position. The cone clutch element engages the rotating drive shaft when in the clutch engaged position. A clutch spring biases the cone clutch element into the clutch engaged position with a clutch engagement force.

A bearing assembly mounts the cone clutch element between the housing member and the rotating drive shaft. A reduced size bearing assembly is utilized which provides the necessary operation and performance but is not reduced too far in size to wear the mating shaft or allow unnecessary movement, One of the carrier members for the spring member also has a preferred ratio of its axial contact length to its inner diameter. This reduces abrasion damage to the piston rod. The clutch spring member further has a preferred ratio of wire diameter to the spring diameter. This maximizes the spring force which minimizes spring length.

The overall axial length of the clutch fan assembly is also reduced which correspondingly reduces the ratio of axial length to overall diameter. The reduced size of the assembly saves cost in materials, reduces weights and allows use where packaging constraints present use of known cone clutch fan assemblies.

Other objects and features of the present invention will become apparent when viewed in light of the detailed description and preferred embodiment when taken in conjunction with the attached drawings and claims.

DESCRIPTION OF PREFERRED EMBODIMENTS

Figure 1:
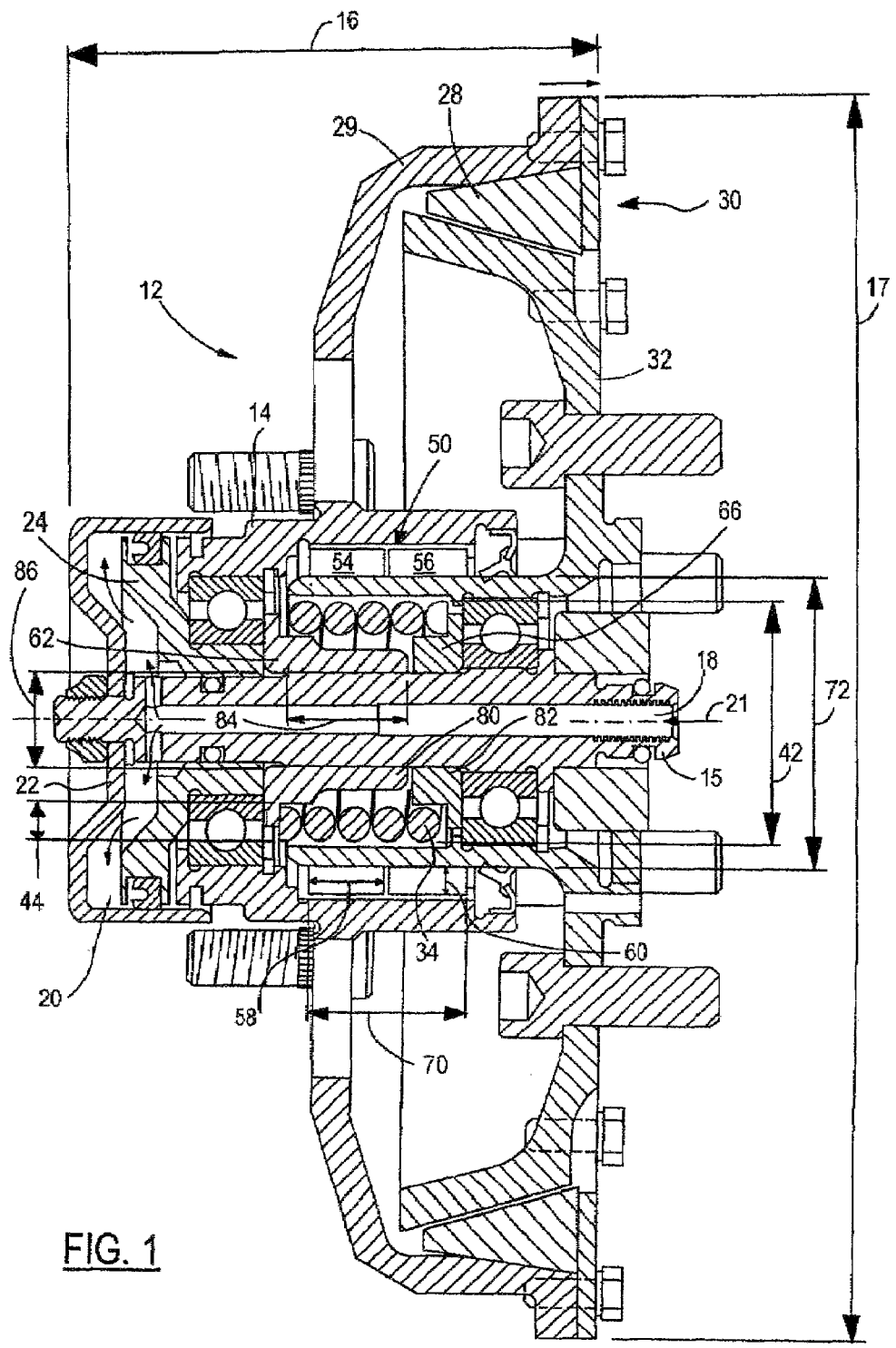
FIG. 1 is an illustration of cone clutch fan drive in accordance with the present invention, the clutch assembly illustrated in the clutch disengaged position.

Referring now to FIG. 1 which is an airactuated cone clutch fan drive assembly 12 in accordance with the present invention. The fan drive assembly 12 has a clutch assembly length 16 and diameter 17 (housing diameter). The present invention provides novel and valuable improvements to the clutch assembly 12 that allow for the minimization of the clutch assembly length 16, which in turn allows the clutch assembly 12 to be utilized in a wide variety of automotive applications while providing minimal impact on surrounding structures. Reducing the length of the assembly results in the use of smaller and more compact components which also creates savings in material component expense. At the same time, however, it is also necessary to not reduce performance or operation of the fan clutch. Instead, it is necessary to optimize the components for accomplishing this result.

The clutch assembly 12 includes a central piston member 15 positioned within the clutch housing 14. Preferably positioned along the centerline of the assembly, the central piston member 15 provides a passageway 18 through which pressurized air 21 may be selectively passed. The pressurized air passes through the central piston member 15 and into a pressure chamber 20 formed between a chamber cap 22 and a translatable clutch piston member 24. When air pressure is supplied, the pressure chamber 20 becomes pressurized and the clutch piston member 24 is moved into a piston activated position. This is shown in FIG. 1. In this position, the translatable clutch piston member 24 moves the cone clutch element 28 into a clutch disengaged position 30. The cone clutch element 28, or friction liner, is attached to housing portion 29 of the clutch housing 14 which, in turn, is attached to the translatable clutch piston 24. When in the clutch disengaged position 30, the cone clutch element 28 disengages from the rotating drive shaft 32 such that the rotating drive shaft 32 rotates independently from the cone clutch element 28.

Figure 2:
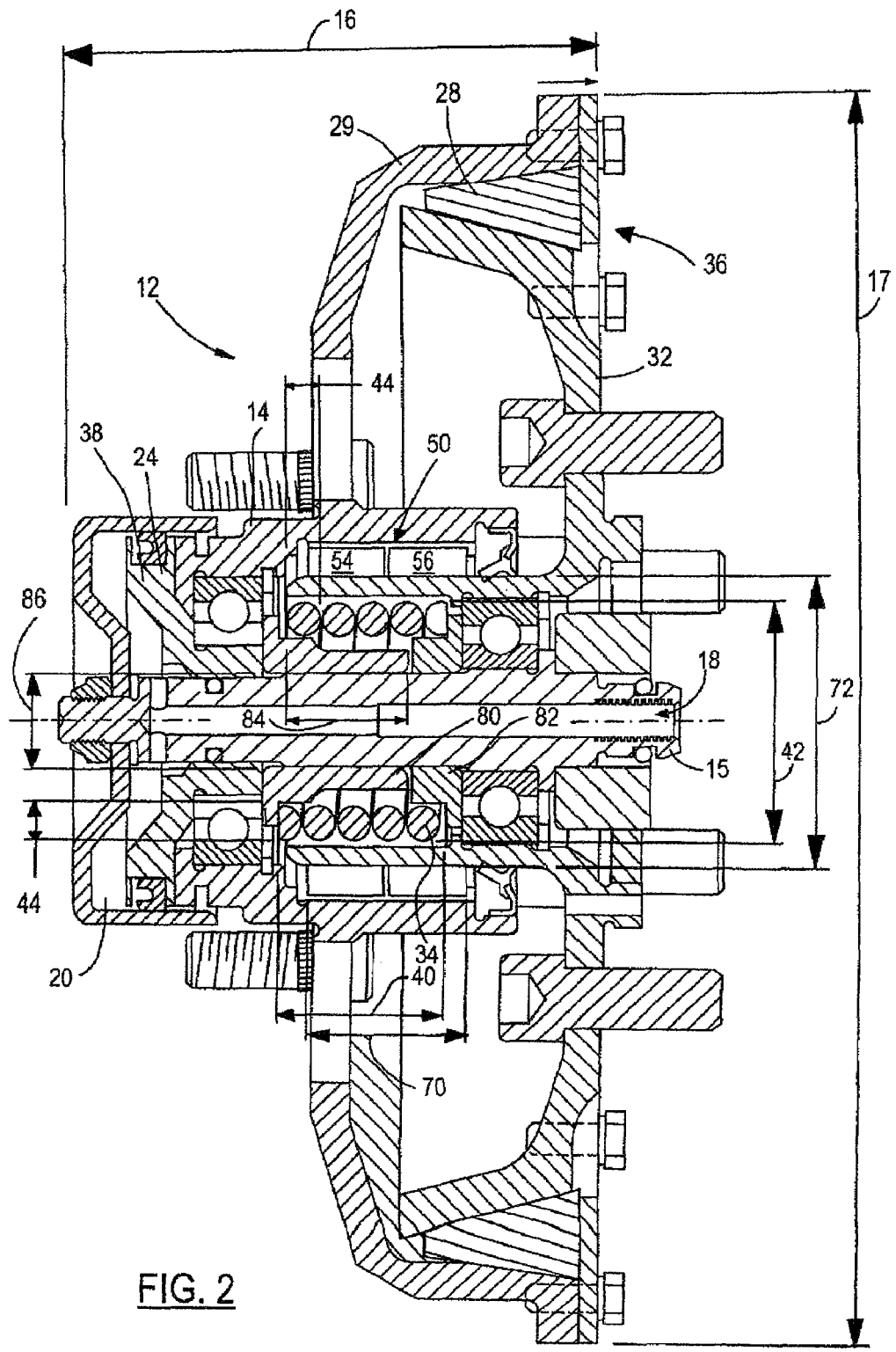
FIG. 2 is an illustration of cone clutch fan drive in accordance with the present invention, the clutch assembly illustrated in the clutch engaged position.

The present invention includes a clutch spring member 34 positioned within the clutch housing 14 that biases the cone clutch element 28 into a clutch engaged position 36 (see FIG. 2). When pressure within the pressure chamber 20 is released, the clutch spring 34 moves the cone clutch element 28 into the clutch engaged position 36 and the translatable clutch piston 24 moves into the piston neutral position 38. The clutch spring 34 also provides a maximum spring force which in turn translates into a clutch engagement force between the cone clutch element 28 and the rotating drive shaft 32. This force prevents slippage between the clutch 28 and the drive shaft 32. As a maximum spring force is necessary for proper operation, standard clutch springs 34 have been found to require a minimum spring length 40 in order to produce the desired clutch engagement force. This, in turn, makes it difficult to reduce the clutch assembly length 16 to improve packaging considerations.

The spring 34 is positioned in carrier members or end caps 80 and 82. The moving carrier member 80 has an axial contact length 84.

The present invention increases the overall diameter 42 of the spring 34 while reducing the wire diameter 44 such that a maximum spring force is achieved over a minimum spring length 40. Research has determined that the primary spring ratio of wire diameter 44 to spring outer diameter 42 is preferably less than 0.14 and is preferably approximately 0.134 in order to provide proper spring force over a suitable spring length 40. Additionally, by allowing the maximum spring force in this configuration to be approximately equal to two thirds of the maximum stress the spring can experience (in the fully compressed state), the present configuration provides the minimally required clutch engagement force over the lifetime of the cone clutch fan drive assembly 12. Reduction of clutch length without alteration of spring diameter can result in stresses exceeding the spring wire maximum limit of two-thirds yield strength. By increasing diameter 42, the stresses may be maintained below the two-thirds limit. This large diameter and shortened length clutch spring 34 preferably results in a secondary spring ratio of spring length 40 to spring diameter 42 less than 1.0 and is preferably 0.68. These dimensional constraints allow for a significant reduction in clutch assembly length 16 without a reduction in clutch performance. In one embodiment, the clutch assembly length 16 was reduced by 0.6 inches.

The present invention also reduces the spring rate to approximately 387 lbs/inch. This results in a smaller drop off in clutch capacity as the friction liner 28 wears and the spring 34 stretches. It is known that clutch travel, between clutch engaged position 36 and clutch disengaged position 30, may increase over clutch life from approximately 0.05 inches when the clutch is new to 0.160 inches at the end of the life of the clutch. The present invention reduces spring rate and design such that this increase in travel results in a reduction in spring force loss between new and used. This reduction in spring drop-off is highly beneficial.

The present invention in addition utilizes a unique needle bearing assembly 50 positioned between the rotating drive shaft 32 and the cone clutch element 28. The needle bearing assembly 50 is comprised of a first needle bearing 54 and a second needle bearing 56. It is noted that the reduction in spring length 40 places additional heat and wear on the bearing package 50. The present invention addresses this by assuming that each of the needle bearings 54, 56 includes a bearing length 58 and a bearing height 60. The ratio of the bearing length 58 to bearing height 60 is less that 3 to 1 and preferably is 2 to 1. This was determined to prevent bearing overheating and wear that may be produced through the reduction of clutch assembly length 16 and additional part shortening.

The ratio of the length 70 of the needle bearing assembly 50 to its inner diameter 72 is also significant. The length 70 is the length of the contact of the needle bearing assembly 50 with housing 14 and the drive shaft 32. Due to reduced packaging constraints, it has been determined that a ratio of the length 70 to the inner diameter 72 should be in the range of 0.37-0.50 for acceptable performance and operation. A ratio of 0.45 is preferred for optimal performance. The ratio of the bearing assembly length to inner diameter with existing fan clutches of this type is about 0.73. If the length 70 is not of sufficient length, the fan could rock side to side which is undesirable, This also could create a perception that the clutch is broken or worn out. In addition, a needle bearing having a ratio outside the determined ratio range could create unnecessary wear on the drive shaft creating premature failure of the clutch.

The size and length of the spring carrier members 80 and 82 (also called "end caps") is also significant. Carrier member 80 extends substantially the length of the spring member 34, preferably 80-90% of that length. Although the carrier member 82 as shown has some length in the axial direction, the carrier member 82 also could be merely a flat washer or the like.

It has been determined that the ratio of axial contact length 84 of the carrier member 80 (i.e. the contact length of the carrier member 80 with the central piston member 15) to the inner diameter 86 of the carrier member 80 for acceptable operation and performance of the clutch is preferably in the range of 0.70 to 1.52, with the ratio being about 1.29 for optimal performance. With existing fan clutches, the ratio of axial length of the carrier members to their inner diameters is about 1.72. The upper end of the ratio range with the present invention, namely 1.52, was determined by the packaging constraints. The lower end of the ratio range was determined by the limitation on abrasion damage to the piston rod member 90 due to the reduced contact area.

Existing airactuated cone clutch fan assemblies have a ratio of overall length (corresponding to length 16 in the drawings) to overall diameter (corresponding to diameter 17 in the drawings) of about 0.51. That is, with a clutch fan assembly with a diameter of about 200 mm, the length is about 103 mm. Due to overall assembly strength and torque capacity sufficient to fulfill the specifications for use of cone clutch fan assemblies, an overall diameter of 200 mm is currently necessary and should not be reduced. With the present invention, however, to achieve a clutch fan assembly having a reduced length, for packaging constraint purposes, the axial length 16 can be reduced to 84-90 mm (preferably 88 mm). This creates a ratio of axial length to diameter of 0.42-0.45, and preferably 0.44. In this regard, the smallest axial length of 84 mm is determined by limitations on the performance of the needle bearing assembly 50.

The present invention creates a new airactuated cone clutch fan assembly which is reduced in size and still meets all of the requisite operation and performance requirements. The reduction in size reduces the weight of the clutch fan assembly which creates a corresponding reduction in material cost and an increase in fuel efficiency for the vehicle in which it is installed. The reduction in size also allows use of the clutch fan assembly in vehicles which have packaging limitations.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A clutch assembly for a fan drive system of an engine comprising:
    a central piston member in a clutch housing feeding a pressure chamber;
    a translatable clutch piston positioned within said clutch housing and in communication with said pressure chamber, said translatable clutch piston movable between a piston neutral position and a piston activated position, wherein air pressure fed through said central piston member into said pressure chamber moves said translatable clutch piston from said piston neutral position to said piston activated position;
    a rotating drive shaft positioned within said clutch housing;
    a cone clutch member in communication with said translatable clutch piston such that said cone clutch member is moved from a clutch engaged position to a clutch disengaged position in response to said translatable clutch piston moving from said piston neutral position to said piston activated position, said cone clutch member engaging aid rotating drive shaft when in said clutch engaged position;
    a clutch spring member positioned between said rotating drive shaft and said central piston member, said clutch spring member biasing said cone clutch member into said clutch engaged position with a clutch engagement force;
    at least on movable carrier member positioned adjacent said clutch spring member; and
    a needle bearing assembly positioned between said rotating drive shaft and said clutch housing, said needle bearing assembly having an axial length and an inner diameter,
    wherein the ratio of said axial length to said inner diameter is in the range of about 0.37 to about 0.50.

2. A clutch fan assembly as described in claim 1, wherein said ratio of said axial length to said inner diameter is about 0.45.

3. A clutch fan assembly as described in claim 1, wherein said needle bearing assembly comprises:
    a first needle bearing and a second needle bearing, each of said needle bearings having a bearing length and a bearing height, the ratio of said bearing length to said bearing height being less than 3 to 1.

4. A clutch fan assembly as described in claim 3, wherein said ratio of said bearing length to said bearing height is approximately 2 to 1.

5. A clutch fan assembly as described in claim 1, wherein said clutch spring member has a spring length and a spring diameter, and the ratio of said spring length to said spring diameter is less than 1.0.

6. A clutch fan assembly as described in claim 1, wherein said clutch spring member has a spring length and a spring diameter, and wherein the ratio of said spring length to said spring diameter is in the range from about 1.0 to about 0.68.

7. A clutch fan assembly as described in claim 6, wherein said clutch spring member has a spring diameter and a wire diameter, and wherein the ratio of said wire diameter to said spring diameter is in the range from about 0.134 to about 0.14.

8. A clutch fan assembly as described in claim 1, wherein said clutch assembly has an overall axial length and an overall diameter, and the ratio of said overall axial length to said overall diameter is about 0.44.

9. A clutch fan assembly as described in claim 1 wherein said movable carrier member has an axial contact length and an inner diameter, and wherein the ratio of said axial contact length to said inner diameter is about 0.70 to about 1.52.

10. A clutch fan assembly as described in claim 9 wherein said ratio is about 1.29.

11. A clutch fan assembly as described in claim 1 wherein said carrier member has an axial length which is about 80-90% of the axial length of said clutch spring member.

12. A clutch fan assembly for a fan drive system of an engine comprising:
    a clutch housing having an overall length and an overall diameter;
    a central piston member in said clutch housing feeding a pressure chamber;
    a translatable clutch piston positioned within said clutch housing and in communication with said pressure chamber, said translatable clutch piston member movable between piston neutral position and a piston activated position, wherein air pressure fed through said central piston member into said pressure chamber moves said translatable clutch piston member from said piston neutral position to aid piston activated position;
    a rotating drive shaft positioned within said clutch housing;
    a cone clutch member in communication with said translatable clutch piston member such that said cone clutch member is moved from a clutch engaged position to a clutch disengaged position in response to said translatable clutch piston member moving from said piston neutral position to said piston activated position, said cone clutch member engaging said rotating drive shaft when in said clutch engaged position;
    a clutch spring member positioned between said rotating drive shaft and said central piston member, said clutch spring member biasing said cone clutch member into said clutch engaged position with a clutch engagement force, said clutch spring member having a spring length, a maximum spring force, a wire diameter, and a spring diameter;
    a bearing in member positioned in said housing; and
    at least on movable carrier member positioned adjacent said clutch spring member; said carrier member having an axial contact length and an inner diameter; and
    wherein a ratio of said axial contact length to said inner diameter is about 0.70 to about 1.52.

13. A clutch fan assembly as described in claim 12, wherein said bearing member comprises a dual needle bearing assembly, said dual needle bearing assembly having an axial length and an inner diameter, and wherein the ratio of said axial length to said inner diameter is about 0.37 to about 0.50.

14. A clutch fan assembly as described in claim 13, wherein the ratio f the axial length of a needle bearing in said dual needle bearing assembly to the annular height of said needle bearing in said dual needle bearing assembly is about 2 to 1.

15. A clutch fan assembly as described in claim 12, wherein the ratio of said spring length to said spring diameter is less than 1.0.

16. A clutch fan assembly as described in claim 15, wherein said ratio of spring length to said ratio of spring diameter is about 0.68.

17. A clutch fan assembly as described in claim 12, wherein said maximum spring force is approximately 66 percent of a spring maximum stress.

18. A clutch fan assembly as described in claim 12 wherein the ratio of said clutch assembly overall length to said clutch assembly overall diameter is about 0.44.

19. A method of producing a clutch fan assembly for use in a fan drive system of an engine, said clutch fan assembly having a clutch housing member, a translatable piston member, a drive shaft member, a bearing assembly, a spring member and at least one movable carrier member, said spring member having a first diameter and comprising a wire member having a second diameter, said method comprising:

selecting said spring member with a certain diameter and selecting said wire diameter of said spring member, such that a maximum spring force is achieved in a minimum spring length;

selecting the axial length of said clutch housing to accommodate said spring member;

providing said movable carrier member with a ratio of its axial contact length to its inner diameter in the range of about 0.70 to about 1.52; and providing said bearing assembly with a ratio of its axial length to its inner diameter in the range of about 0.37 to about 0.50.

20. The method as described in claim 19, further comprising:

selecting the ratio of the wire diameter of said spring member to the diameter of said spring member below about 0.14 such that a maximum spring force is achieved while minimizing said spring length.

21. The method as described in claim 19, further comprising:

optimizing said maximum spring force at two thirds of the maximum stress of said spring member.

22. The method as described in claim 19, further comprising:

selecting the ratio of the axial length of said spring member to the diameter of said spring member to less than about 0.7.

23. The method as described in claim 19, further comprising:

selecting the ratio of the axial length of a needle bearing in said bearing member to the annular height of said needle bearing less than about 3 to 1.

\* \* \* \* \*

UNITED STATES PATENT AND TRADEMARK OFFICE
CERTIFICATE OF CORRECTION

PATENT NO. : 7,731,006 B2
APPLICATION NO. : 11/675156
DATED : June 8, 2010
INVENTOR(S) : Samuel E. Settineri Page 1 of 1

It is certified that error appears in the above-identified patent and that said Letters Patent is hereby corrected as shown below:

IN THE CLAIMS:

Column 5, Line 48, Claim 1: "at least on movable" should read -- at least one movable --
Column 6, Line 50, Claim 12: "central piston" should read -- control piston --
Column 6, Line 56, Claim 12: "a bearing in member" should read -- a bearing member --
Column 7, Line 2, Claim 14: "the ratio f the axial length" should read -- the ratio of the axial length --

Signed and Sealed this
Twenty-eighth Day of February, 2012

David J. Kappos
*Director of the United States Patent and Trademark Office*